(12) United States Patent
Bauchot et al.

(10) Patent No.: US 8,561,525 B2
(45) Date of Patent: Oct. 22, 2013

(54) NANO TIMER CONTROL SYSTEM

(75) Inventors: Frederic Bauchot, Saint-Jeannet (FR);
Jean-Yves Clement, Saint-Jeannet (FR);
Carole Truntschka, Saint-Laurent-du-Var (FR)

(73) Assignee: International Business Machines Corporation, Armonk, NY (US)

(*) Notice: Subject to any disclaimer, the term of this patent is extended or adjusted under 35 U.S.C. 154(b) by 483 days.

(21) Appl. No.: 12/861,088

(22) Filed: Aug. 23, 2010

(65) Prior Publication Data
US 2011/0127342 A1    Jun. 2, 2011

(30) Foreign Application Priority Data

Nov. 30, 2009    (EP) .................................... 09306157

(51) Int. Cl.
*A47J 27/62*    (2006.01)

(52) U.S. Cl.
USPC .............................. 99/337; 219/440; 219/710

(58) Field of Classification Search
USPC ...... 236/46 A–46 R, 53, 20–26; 99/337, 342, 99/292, 468; 219/702, 627, 494, 667, 710, 219/713, 714, 626, 618, 440, 431; 374/143, 374/100, 102, 103, 141
See application file for complete search history.

(56) References Cited

U.S. PATENT DOCUMENTS

| | | | |
|---|---|---|---|
| 5,653,037 A * | 8/1997 | Hasegawa et al. | 33/543.1 |
| 6,953,919 B2 * | 10/2005 | Clothier | 219/620 |
| 7,282,838 B2 * | 10/2007 | Zanella et al. | 310/339 |
| 2004/0155537 A1 * | 8/2004 | Nakano et al. | 310/51 |
| 2005/0178274 A1 * | 8/2005 | Cartigny et al. | 99/337 |
| 2006/0082258 A1 * | 4/2006 | Mancosu et al. | 310/339 |
| 2006/0112834 A1 * | 6/2006 | Imura | 99/342 |
| 2007/0092982 A1 * | 4/2007 | Nien | 438/50 |
| 2009/0121837 A1 * | 5/2009 | Kitayoshi et al. | 340/10.1 |

* cited by examiner

*Primary Examiner* — Quang Van
*Assistant Examiner* — Michael Laflame, Jr.
(74) *Attorney, Agent, or Firm* — Andrea Bauer; Hoffman Warnick LLC

(57) ABSTRACT

The invention provides a pressure controlled device and a system for managing the heating time of a pressure controlled device. The system includes a sensing device that allows the timing of a heating period for the pressure controlled device based on temperature and/or pressure values sensed inside the pressure controlled device. A RFID tag is coupled to the sensing device and is operable for generating timing information. The sensing device and the RFID tag are powered by a nano electromechanical (NEM) device that is operable by a source of pressurized air.

18 Claims, 3 Drawing Sheets

NANO TIMER CONTROL SYSTEM

FIELD OF THE INVENTION

The present invention relates generally to the field of temperature and pressure controlled cookers and, more particularly, to a system and method for controlling such cookers using nano electromechanical and RFID technologies.

RELATED ART

It is known in the state of the art that pressure cooking is a method of cooking in a sealed vessel that does not permit air or liquids to escape below a preset pressure. Because the boiling point of water increases as the pressure increases, the pressure built up inside the pressure cooker allows the liquid in the pressure cooker to rise to a higher temperature before boiling.

A pressure cooker is often referred to by several names, such as a steam digester, pressure canner, or pressure controlled recipe. A version of a pressure cooker used by laboratories and hospitals to sterilize materials is known as an autoclave. In the food industry, pressure cookers are often referred to as retorts.

A gasket or sealing ring forms a gas-tight seal, which does not allow air or steam to escape between the pot and the cover. Normally, the only way the steam can escape is through a regulator on the cover when the pressure has built up. In case the regulator is blocked, a safety valve is provided as a backup escape route for steam. The simplest safety valve is a loose fitting rubber plug in the cover, held in place by steam pressure. If the pressure exceeds design limits, the plug pops out of its seat.

The food to be cooked or the medical instruments to be sterilized are placed in the pressure cooker with a small amount of water. The vessel is then sealed and placed on a heat source. As the internal temperature rises, the pressure also rises, until the pressure reaches the design gauge pressure. However, controlling the pressure is not easy and steam production may be too important.

Moreover, pressure cookers have a reputation to be dangerous with the risk of explosion. Modern pressure cookers typically have two or three independent safety valves, as well as some additional safety features, such as an interlock to prevent opening the cover while internal pressure exceeds atmospheric pressure. However there is still a risk of explosion, especially if cookers are not thoroughly and regularly maintained.

U.S. 2006/0112834A1 discloses a controlled pressure cooker implementing a RFID tag in a cooking timer to start and stop the cooking process. A sealed cookware and servingware object, such as a pressure cooker, is provided. The object is temperature and pressure regulated using control technology such as Radio Frequency Identification (RFID) technology and temperature sensors associated with the objects. In a first embodiment, the temperature sensor is at least partially embedded in the base of the object. In a second embodiment, the temperature sensor extends through a tunnel in a wall of the object and includes a sealing cap to cover the tunnel and prevent air and/or liquid from escaping the interior of the object.

Prior art systems based on a RFID tag require a power source to supply the RFID tag.

Powering a RFID may be provided in two ways: either a constant radio frequency field is generated by an external reader as in a classic short range RFID solution or a battery is added to the pressure cooker. The first powering solution exposes the cook to a permanent high strength field in a small area such as a laboratory or a kitchen. In the second powering solution, the RFID tag presents the sensitivity of an active transponder, which then removes the problem of the high strength field. However, there is the requirement of having a battery which needs to be replaced periodically leading then to the drawbacks of battery recycling and cost.

SUMMARY OF THE INVENTION

There is a need of a self-powering system to control pressure cookers.

The present invention offers a solution to address the aforementioned needs.

Accordingly, the present invention provides a system and a method for controlling a pressure cooker using a self-powered timer.

The present invention further provides a battery-less system and a method for controlling a pressure cooker.

According to the invention, a nano power generator, coupled to a timer and a RFID tag, are used.

Further aspects of the invention will now be described, by way of implementation and examples, with reference to the accompanying figures.

BRIEF DESCRIPTION OF THE DRAWINGS

The above and other items, features and advantages of the invention will be better understood by reading the following more particular description of the invention in conjunction with the figures.

DETAILED DESCRIPTION OF THE INVENTION

Embodiments of the invention are described hereinafter by way of examples with reference to the accompanying figures and drawings.

Figure 1:
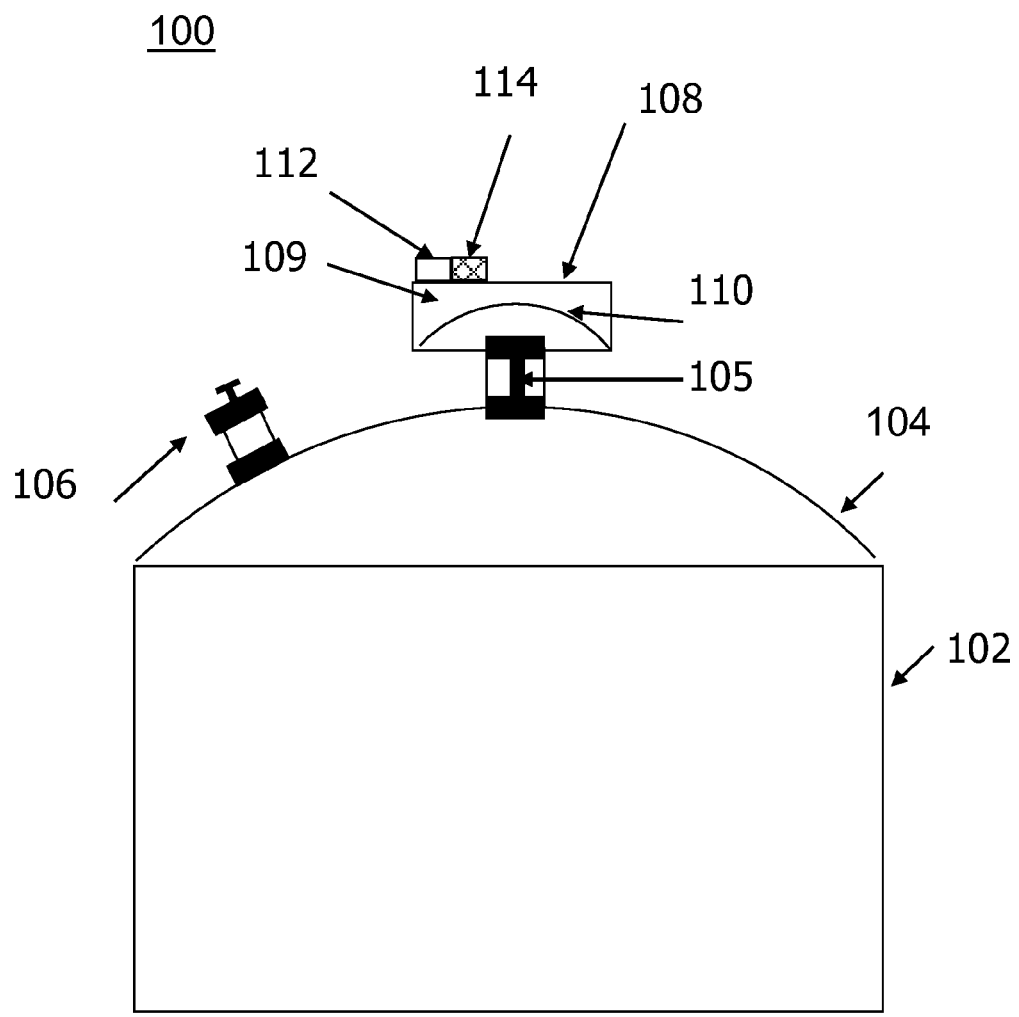
FIG. 1 is a schematic view of a pressure cooker according to an embodiment of the present invention.

FIG. 1 is a schematic illustration of a pressure cooker 100 in accordance with an embodiment of the present invention. The pressure cooker 100 comprises typical pieces of standard pressure cookers such as a housing 102 closed by a housing cover 104 equipped with a safety valve and pressure regulator 106. Additional typical components are omitted from the figure and description for sake of clarity. An air/pressure system located on top of the housing cover 104 includes an enclosure 108 that contains a membrane 110, a nano electromechanical system 112, and a Radio Frequency IDentification (RFID) tag 114.

The membrane 110 in the enclosure 108 is subject to a deformation proportional to the pressure ramp up in the pressure cooker 100. The pressure is transmitted through a conduit 105 between the housing cover 104 and the enclosure 108. The membrane 110 further acts to prevent steam from passing through nano electromechanical system 112, thereby avoiding damaging it. The membrane 110 also allows pressurizing in the enclosure 108 the space 109 located above the membrane 110. The air contained in this cavity 109 provides energy required to power the nano electromechanical system 112. As the air consumption of the nano electromechanical system 112 is very low, the pressure value in the cavity is not affected.

In an alternate embodiment, a safety valve (not shown on FIG. 1) is added on the enclosure to balance air pressure at the end of cooking time. When the pressure increases in the cavity 109 the nano electromechanical system 112 is activated, starting a heating timing duration transmitted to the RFID tag 114.

Figure 2:
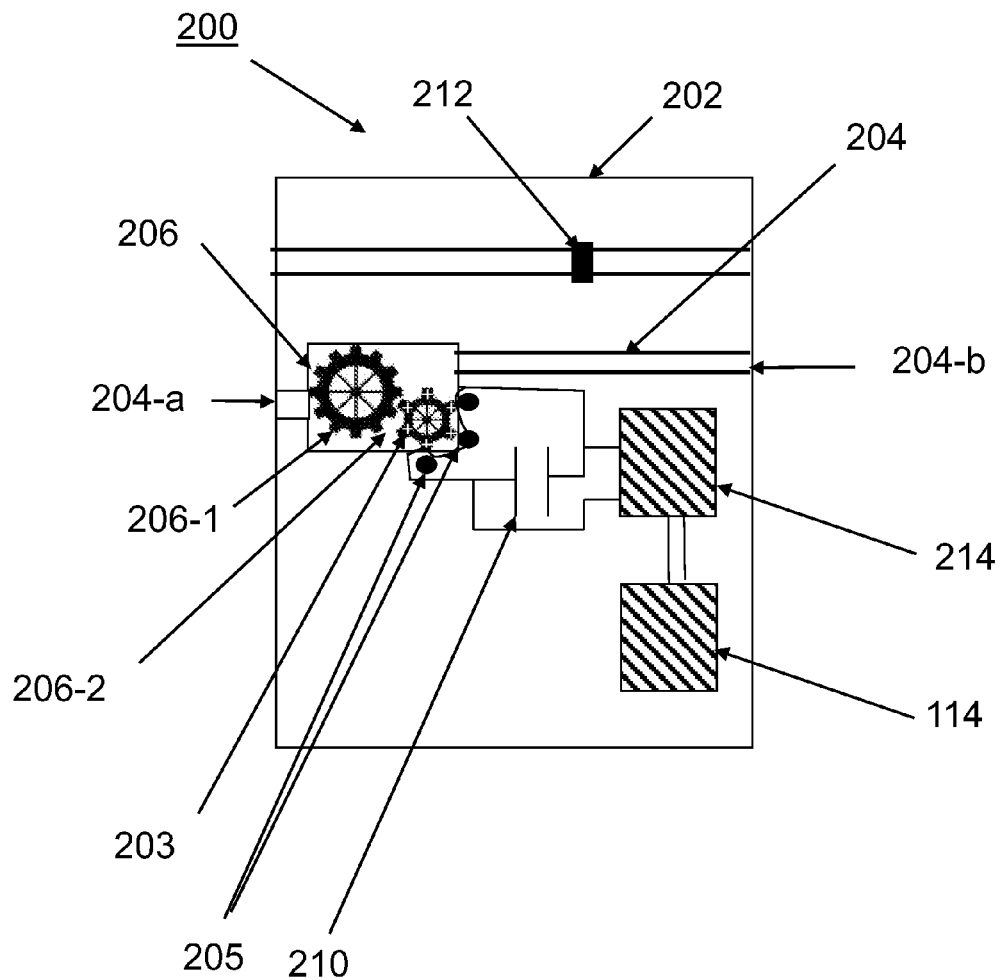
FIG. 2 details a nano electromechanical system in accordance with an embodiment of the present invention.

FIG. 2 depicts an embodiment of the nano electromechanical system 112, namely nano electromechanical system 200, including a nano power generator 206, timer 214, and RFID tag 114.

Whereas a long and detailed description on nanotechnology is not provided herein, some general concepts are described for clarity and understanding of the present invention. However, it is to be appreciated that any variations in the implementation, material, or form of the nano electromechanical system 112, may be made herein without departing from the spirit and scope of the invention.

Nano electromechanical systems, often abbreviated as NEMS, encompass devices integrating electrical and mechanical functionality on the a nano scale. NEMS typically integrate transistor-like nano electronics with mechanical actuators, pumps, or motors.

The nano electromechanical system 200 comprises an air path 204 allowing circulation of compressed air. The air path 204 receives from enclosure 108 compressed air flux on an inlet air path (204-a), generated by the deformation of the membrane 110, and outputs compressed air flux at an outlet air path (204-b).

The nano power generator 206 is composed of a nano wheel 206-1 and a nano dynamo 206-2. The compressed air flux arriving at the inlet air path 204-a initiates the rotation of nano wheel 206-1. The rotation of nano wheel 206-1 generates the rotation of the nano dynamo 206-2.

The nano dynamo 206-2 includes a rotor 203 with magnetized pole and coils 205. The rotor 203 with the coils 205 operates as a miniaturized dynamo that generates energy.

A capacitive device 210 stores the energy generated by the nano dynamo 206-2 and operates as a temporary battery in case of a failure of the nano power generator 206. The power thus generated supplies the timer 214 and the RFID tag 114.

The timer 214 senses/measures temperature and/or pressure and calculates the quantity of heat received in the pressure cooker. Based on cooking/sterilization settings given by the operator, through the RFID tag 114, the timer 214 determines the cooking/sterilization time duration.

Time duration information is then available for the RFID tag 114. At the end of the time duration, the timer 214 sends the end of cooking/sterilization information to the RFID tag 114. The RFID tag 114 generates, for a tag reader, an order to stop heating the pressure cooker.

In alternate embodiments, the RFID tag 114 may provide various timing information. For example, the RFID tag 114 may provide cooking/sterilization time duration or pressure and temperature at given time intervals to allow, for example, a remote software device coupled to the tag reader to compute its own cooking/sterilization time duration. Further, the tag reader can be embedded into a control board of a heating device to automatically stop the heating of the pressure cooker.

As already mentioned, in order to balance pressure in the cavity 109, the nano electromechanical system 200 may be further equipped with a safety valve 212 which opens at the end of cooking/sterilization time.

It will be appreciated that the present invention may be used with a pressure cooker made with any material and heat on any heating source, including induction, gas, electric, etc.

Figure 3:
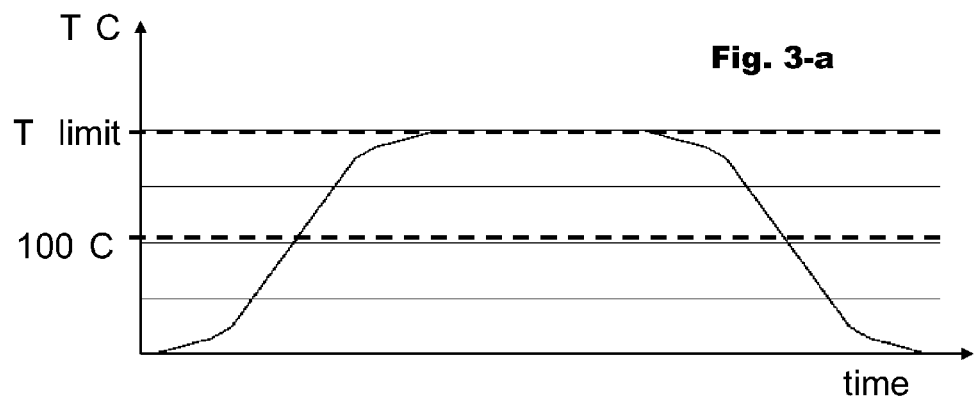
FIG. 3 illustrates several temperature ramp-up curves.
Figure 3:
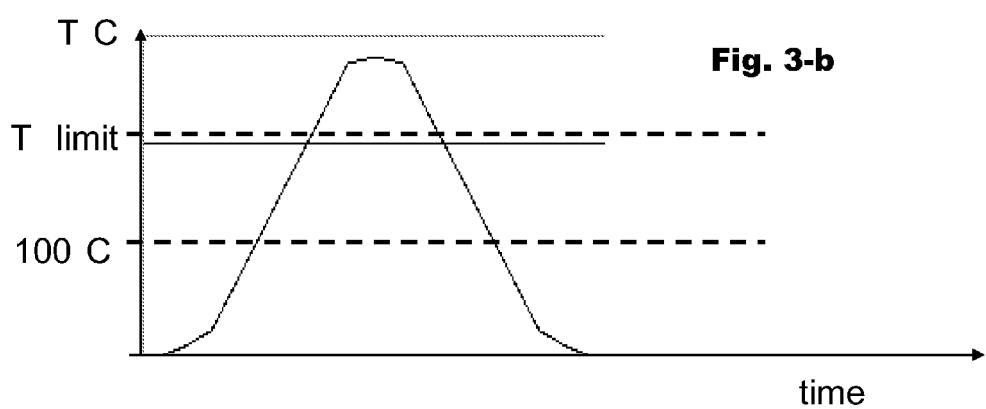
Figure 3:
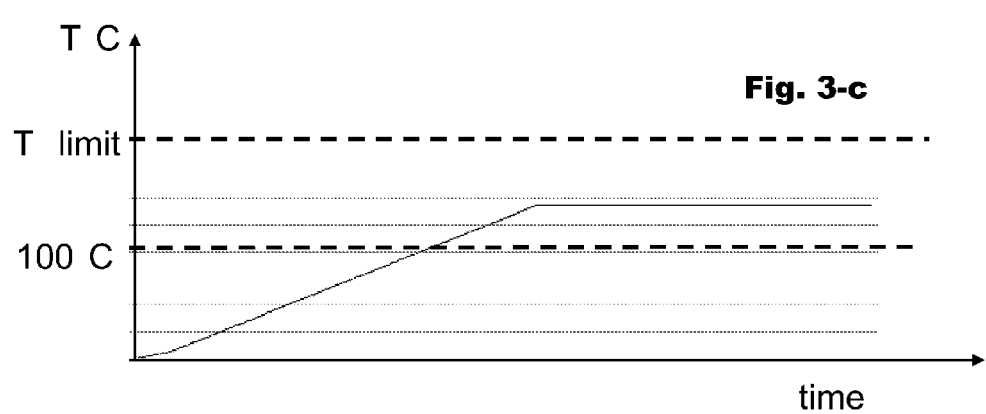

FIG. 3 shows several examples of time-temperature ramp-up curves that take advantage of the system of the present invention.

As already explained before, cooking or sterilization conditions depend on the quantity of heat received by the food or by the medical materials in the pressure cooker. The pressure cooker stabilizes the temperature by regulating the internal pressure. To control the duration of the cooking/sterilization time in a standard pressure cooker, a cooking/sterilization time is applied when the pressure regulator starts to operate. This has two effects. Firstly, cooking/sterilization is not precise because the shape of the temperature ramp-up is not considered. However, this parameter depends on the heat source used to heat the pressure cooker. Secondly, as the temperature ramp-up is not controlled, and moreover as it is not possible to precisely control the heat source used to heat the pressure cooker, it becomes not possible to set the pressure regulator to a value that is not achievable even by the worst heat source.

One of the advantages of the present invention is that the system is able to record in the timer 214 both the temperature and the pressure as soon as the temperature increases, generating a variation of pressure which allows the nano power generator 206 to operate, even if the variation of pressure is small.

On FIG. 3-a, a temperature ramp-up is shown for a conventional cooking where the pressure regulator operates when a maximum temperature is reached. In prior art systems, cooking time is manually determined by measuring pressure regulator operating time. On the contrary, with the present invention, there is no need to wait for the pressure regulator to set the cooking time duration.

FIG. 3-b illustrates the case where no pressure regulation is used. The temperature increases over a temperature limit. With the present invention, the source heating is stopped when the necessary quantity of heat is reached. No steam leaks out of the cooker, thereby saving energy.

On FIG. 3-c, the temperature ram-up shows the case where a temperature limit is never reached due to an insufficient heating source. Nevertheless with the system of the present invention, end of cooking is determined by considering the quantity of energy applied inside the pressure cooker.

Thus, any shape of temperature ramp-up as shown on FIG. 3 or any variation from those, is integrated for the calculation of cooking time even if the pressure limit provided by the pressure regulator is never reached. To this extent, the system of the present invention allows designing faster pressure cookers because pressure limitation remains only a security feature. It is thus not anymore required to wait for the pressure regulator to start operating to measure the cooking time. Moreover, on top of the cooking time benefit, the system of the present invention limits or suppresses steam emission. Thus, less energy is required to obtain the same cooking/sterilization conditions.

It should be appreciated that while the invention has been shown and described with reference to various embodiment(s), various changes in form and detail may be made therein without departing from the spirit, and scope of the invention. Particularly, no specific description has been made of the process to build the nano electromechanical generator which can be adapted in shape, size to the existing and upcoming nano scale technologies.

The invention claimed is:

1. A system for managing a heating time of a pressure controlled device, comprising:
   a sensing device for timing a heating period for the pressure controlled device according to at least one of temperature or pressure values sensed inside the pressure controlled device;
   a radio frequency identification (RFID) tag, coupled to the sensing device, for generating timing information; and
   a nano electromechanical (NEM) device operable by a source of pressurized air for generating and supplying power to the sensing device and the RFID tag, the nano electromechanical device comprising a wheel coupled to a dynamo, wherein the source of pressurized air rotates the wheel.

2. The system of claim 1, wherein the dynamo further comprises a rotor having a magnetized pole and coils.

3. The system of claim 1, further comprising a capacitive device coupled to the nano electromechanical device.

4. The system of claim 1, wherein the source of pressurized air comprises an enclosure, located on top of the pressure controlled device, in air-flow communication with an inside of the pressure controlled device, and wherein the enclosure further comprises a membrane having a material capable of deforming proportionally to the pressure inside the pressure controlled device.

5. The system of claim 1, further comprising a tag reader for receiving the timing information generated by the RFID tag.

6. The system of claim 5, wherein the tag reader further generates an order to stop the heating of the pressure controlled device.

7. The system of claim 5, wherein the tag reader is embedded into a control board of a heating device to automatically stop the heating of the pressure controlled device.

8. The system of claim 4, wherein the enclosure of the pressure controlled device further comprises a safety valve.

9. The system of claim 1, wherein the pressure controlled device further comprises a housing covered by a housing cover equipped with a safety valve and a pressure regulator.

10. An apparatus, comprising:
    a pressure controlled device;
    a sensing device for timing a heating period for the pressure controlled device according to at least one of temperature or pressure values sensed inside the pressure controlled device;
    a radio frequency identification (RFID) tag, coupled to the sensing device, for generating timing information; and
    a nano electromechanical (NEM) device operable by a source of pressurized air for generating and supplying power to the sensing device and the RFID tag, wherein the nano electromechanical device comprises a wheel coupled to a dynamo, wherein the source of pressurized air rotates the wheel, and wherein the dynamo comprises a rotor having a magnetized pole and coils.

11. The apparatus of claim 10, further comprising a capacitive device coupled to the nano electromechanical device.

12. The apparatus of claim 11, wherein the capacitive device stores energy generated by the dynamo.

13. The apparatus of claim 10, wherein the source of pressurized air comprises an enclosure, located on top of the pressure controlled device, in air-flow communication with an inside of the pressure controlled device, and wherein the enclosure further comprises a membrane having a material capable of deforming proportionally to the pressure inside the pressure controlled device.

14. The apparatus of claim 13, wherein the enclosure of the pressure controlled device further comprises a safety valve.

15. The apparatus of claim 10, further comprising a tag reader for receiving the timing information generated by the RFID tag.

16. The apparatus of claim 15, wherein the tag reader further generates an order to stop the heating of the pressure controlled device.

17. The apparatus of claim 10, wherein the pressure controlled device further comprises a housing covered by a housing cover equipped with a safety valve and a pressure regulator.

18. A method for managing a heating time of a pressure controlled device, comprising:
    timing, using a sensing device, a heating period for the pressure controlled device according to at least one of temperature or pressure values sensed inside the pressure controlled device;
    generating timing information using a radio frequency identification (RFID) tag coupled to the sensing device; and
    generating and supplying power to the sensing device and the RFID tag using a nano electromechanical (NEM) device operable by a source of pressurized air, wherein the nano electromechanical device comprises a wheel coupled to a dynamo, and wherein the source of pressurized air rotates the wheel.

* * * * *